United States Patent
Leu et al.

(10) Patent No.: US 7,019,906 B2
(45) Date of Patent: Mar. 28, 2006

(54) INDIUM-TIN OXIDE THIN FILM FILTER FOR DENSE WAVELENGTH DIVISION MULTIPLEXING

(75) Inventors: Charles Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 399 days.

(21) Appl. No.: 10/044,268

(22) Filed: Jan. 8, 2002

(65) Prior Publication Data

US 2003/0128430 A1    Jul. 10, 2003

(51) Int. Cl.
*G02B 5/28*    (2006.01)
(52) U.S. Cl. .................. 359/589; 359/586; 359/587; 359/588
(58) Field of Classification Search .......... 359/580, 359/586, 588, 577, 584, 589
See application file for complete search history.

(56) References Cited

U.S. PATENT DOCUMENTS

| | | | |
|---|---|---|---|
| 4,846,551 A * | 7/1989 | Rancourt et al. ............ | 359/589 |
| 5,321,539 A * | 6/1994 | Hirabayashi et al. ....... | 349/198 |
| 5,914,804 A * | 6/1999 | Goossen ...................... | 359/291 |
| 6,042,752 A * | 3/2000 | Mitsui ...................... | 252/520.1 |
| 6,215,592 B1 * | 4/2001 | Pelekhaty .................... | 359/618 |
| 6,490,381 B1 * | 12/2002 | Adair et al. .................. | 385/16 |

* cited by examiner

*Primary Examiner*—Drew A. Dunn
*Assistant Examiner*—Joshua L. Pritchett
(74) *Attorney, Agent, or Firm*—Wei Te Chung

(57) ABSTRACT

A DWDM thin film filter includes a substrate (11) and a film stack (12). The film stack comprises a plurality of cavities (13). Each cavity includes a first group of mirror layers (21), a second group of mirror layers (22), and a spacer layer (23). Each group of mirror layers includes a plurality of high refractive index thin films (31) and low refractive index thin films (32) alternately deposited one on another. The material of the high refractive index films is a composition of indium-tin oxide. In the preferred embodiment, a thin film filter having 160 layers of film can be produced. Such a thin film filter attains the same or better optical characteristics as a conventional DWDM thin film filter having 180 layers of film.

11 Claims, 5 Drawing Sheets

INDIUM-TIN OXIDE THIN FILM FILTER FOR DENSE WAVELENGTH DIVISION MULTIPLEXING

BACKGROUND OF THE INVENTION

1. Field of the Invention

The present invention relates to dense wavelength division multiplexing (DWDM) thin film filters, and particularly to the composition of layers of high refractive index thin films of such thin film filters.

2. Description of Related Art

A DWDM thin film filter comprises a multi-cavity film stack which is deposited on a glass substrate.

U.S. Pat. No. 6,215,592 discloses an optical thin film filter having broad resonant frequency passbands for filtering an optical input, including a plurality of multiplexed optical wavelengths in a first set of transmitted wavelengths and a second set of reflected wavelengths. The filter has first and second inner mirrors separated substantially by an inner spacer, a first outer mirror separated from the first inner mirror substantially by a first outer spacer, and a second outer mirror separated from the second inner mirror substantially by a second outer spacer. The inner mirrors have a reflectivity which is greater than the reflectivity of the outer mirrors. Each inner mirror comprises dielectric layers of high refractive index material and dielectric layers of low refractive index material, alternately deposited one on another to form a stack. In the optical thin film filter, each of the layers in the first and second inner mirrors and in the first and second outer mirrors is generally comprised of one of the following materials: silicon dioxide ($SiO_2$), tantalum pentoxide ($Ta_2O_5$), titanium dioxide ($TiO_2$), aluminum oxide ($Al_2O_3$), hafnium dioxide ($HfO_2$), and zirconium dioxide ($ZrO_2$).

The odd and even numbered standard ITU channels of the above-mentioned optical thin film filter are separated by a frequency spacing of 200 GHz. Modern optical thin film filters are increasingly being required to have channel spacings of 100 GHz, 50 GHz or even less. Accordingly, larger numbers of cavities in optical filters are required to meet the increasingly demanding requirements for pass bandwidth and isolation bandwidth. Internal stress is intrinsic to multilayer optical thin film filters and to the film deposition process involving large numbers of cavities in a film stack. Ever larger numbers of cavities increases internal stress of an optical thin film filter. This results in higher rates of failure during manufacture and in use, and unacceptably high insertion loss of the manufactured optical thin film filters.

SUMMARY OF THE INVENTION

In view of the above, an object of the present invention is to provide a thin film stack of a DWDM thin film filter which has relatively few layers of film and less internal stress.

Another object of the present invention is to provide a DWDM thin film filter which is relatively simple and inexpensive to manufacture.

A further object of the present invention is to provide a thin film filter which is relatively resistant to failure during manufacture and in use.

To achieve the above objects, a DWDM thin film filter in accordance with the present invention comprises a substrate and a film stack. The film stack comprises a plurality of cavities. Each cavity comprises a first group of mirror layers, a second group of mirror layers, and a spacer layer. Each group of mirror layers comprises a plurality of high refractive index thin films and low refractive index thin films alternately deposited one on another. The material of the high refractive index films is a composition of indium-tin oxide.

In the preferred embodiment, a thin film filter having 160 layers of film can be produced. Such a thin film filter attains the same or better optical characteristics than a conventional DWDM thin film filter having 180 layers of film.

Other objects, advantages and novel features of the invention will become more apparent from the following detailed description when taken in conjunction with the accompanying drawings, in which:

DETAILED DESCRIPTION OF PREFERRED EMBODIMENT OF THE PRESENT INVENTION

It is to be understood that the figures as described above have been simplified. Some elements have been drawn out of proportion to illustrate those aspects of the structure of a thin film filter that are relevant for a clear understanding of the present invention. Reference will now be made to the drawings to describe a preferred embodiment of the present invention in detail.

Figure 1:
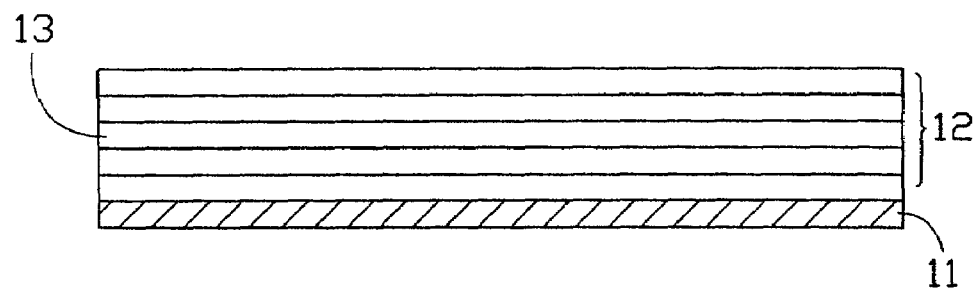
FIG. 1 is a cross-sectional view of a thin film filter in accordance with the present invention.
Figure 2:
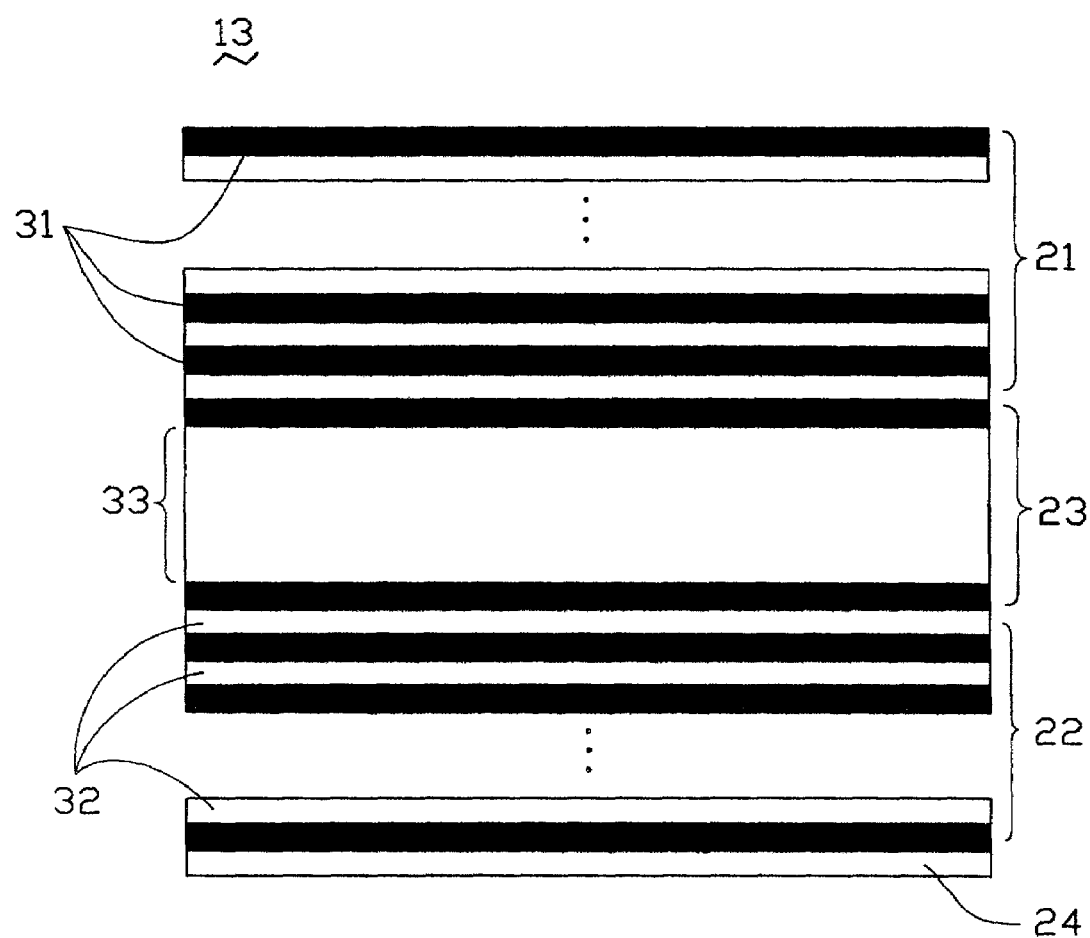
FIG. 2 is a schematic side view of a cavity of the thin film filter of FIG. 1.

Referring to FIG. 1, a thin film filter for dense wavelength division multiplexing in accordance with the present invention comprises a glass substrate 11 and a film stack 12. The film stack 12 comprises five cavities 13, and is deposited on the glass substrate 11. Referring to FIG. 2, each cavity 13 comprises a first group of mirror layers 21, a second group of mirror layers 22, and a spacer layer 23 between the first and second groups of mirror layers 21, 22. The structure of each cavity 13 is (HL)$^m$H(xL)H(LH)$^m$C, where m is an integer and x is an even number. The symbol H represents a high refractive index film. The symbol L represents a low refractive index film. The symbol C represents a coupling film 24 that adjoins an adjacent cavity 13. The coupling film 24 is normally made of a material having a relative low refractive index. Values of m and of x in any one cavity 13 may be different from values of m and of x in any other cavity 13.

Each group of mirror layers 21, 22 comprises a plurality of high refractive index thin films 31 and a plurality of low refractive index thin films 32. The high and low refractive index films 31, 32 are alternately deposited one on another. As shown above, the structure of each group of mirror layers 21, 22 is $(HL)^m$ and $(LH)^m$ respectively, where m is an integer. A thickness of each high refractive index film 31 and of each low refractive index film 32 is equal to a quarter of the central wavelength of a pass bandwidth of the thin film filter. Generally, the number of cavities of a thin film filter is key to determining its pass band shape, while the reflectivity of its groups of mirror layers determine the transmittance of the thin film filter. Two parameters are adjusted to obtain a desired reflectivity. The first parameter is the number of films in each group of mirror layers. The second parameter is the difference between the refractive indices of the high refractive index films and the low refractive index films within each group of mirror layers. The material of the low refractive index films L can be silicon dioxide ($SiO_2$) or aluminum oxide ($Al_2O_3$). In the preferred embodiment, silicon dioxide is used. Silicon dioxide has a refractive index of 1.46. In the preferred embodiment, the material of the high refractive index films H is a composition of indium-tin oxide (ITO). The range of composition of the ITO material used is from 20% indium oxide plus 80% tin oxide to 17% indium oxide plus 83% tin oxide. ITO is used as the material of the high refractive index films 31 because it has a refractive index of 2.1. This is higher than the refractive index of materials conventionally used in high refractive index films; such as, tantalum pentoxide, which has a refractive index of 2.0. Thus a desired reflectivity can be attained using fewer films. ITO also has a special advantage when used in thin films. It is particularly soft and flexible, and more resistant to internal stress in the film layers compared to conventional materials.

As shown above, the structure of each spacer layer 23 is H(xL)H, where x is an even number. The optical thickness of each low refractive index film 32 is equal to a quarter of the central wavelength of the pass bandwidth of the thin film filter. Accordingly, a low refractive index layer 33 of the spacer layer 23 has an optical thickness equal to x times a quarter of the central wavelength of the pass bandwidth of the thin film filter. The optical thickness of each high refractive index film 31 is equal to a quarter of the central wavelength of the pass bandwidth of the thin film filter. Accordingly, the spacer layer 23 has an optical thickness equal to x+2 times a quarter of the central wavelength of the pass bandwidth of the thin film filter.

The substrate 11 is transparent to wavelengths under which the thin film filter operates. The substrate 11 may be made from a wide variety of materials including glass, quartz, optical plastic, silicon, and germanium.

Figure 3:
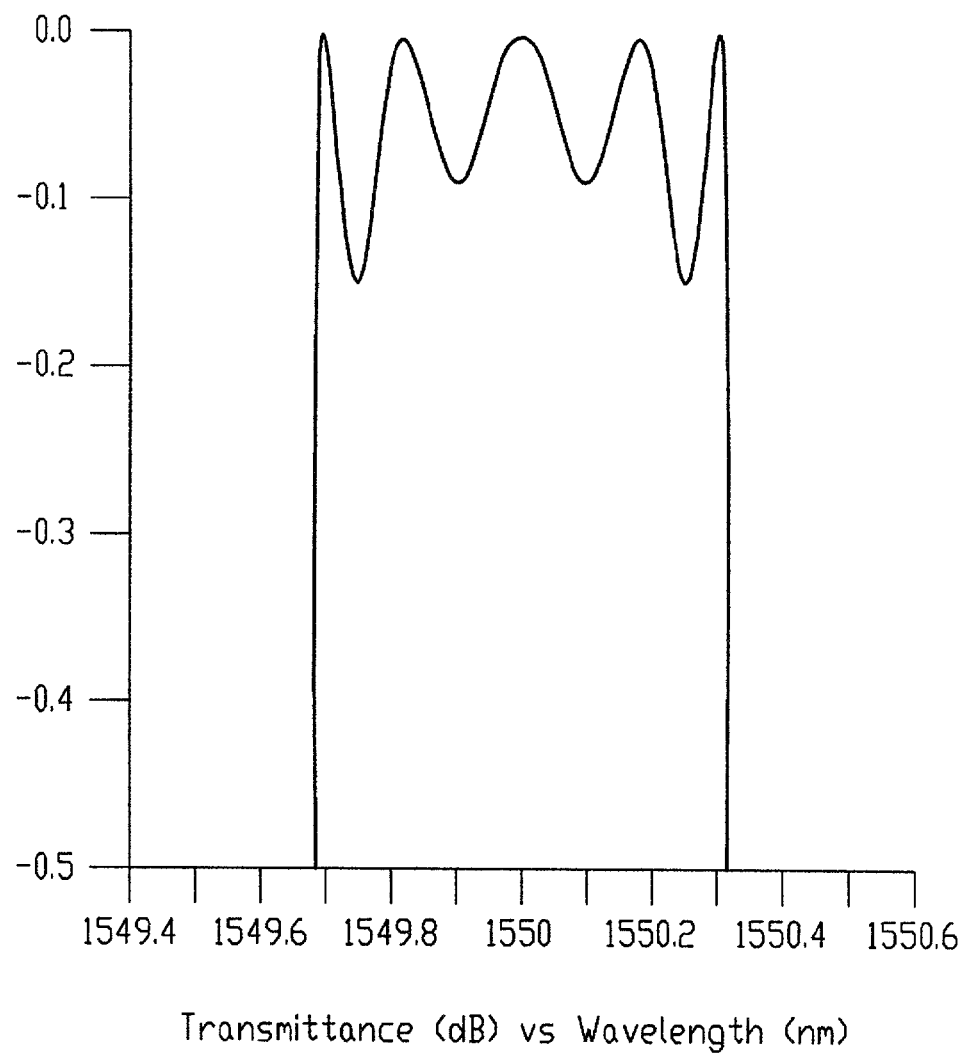
FIG. 3 is a graph of transmittance versus wavelength for a thin film filter having 160 layers of film made according to the present invention, where transmittance is shown on a scale between −0.5 dB and zero dB.
Figure 4:
FIG. 4 is a graph of transmittance versus wavelength for the thin film filter of FIG. 3, where transmittance is shown on a scale between −25 dB and zero dB.
Figure 5:
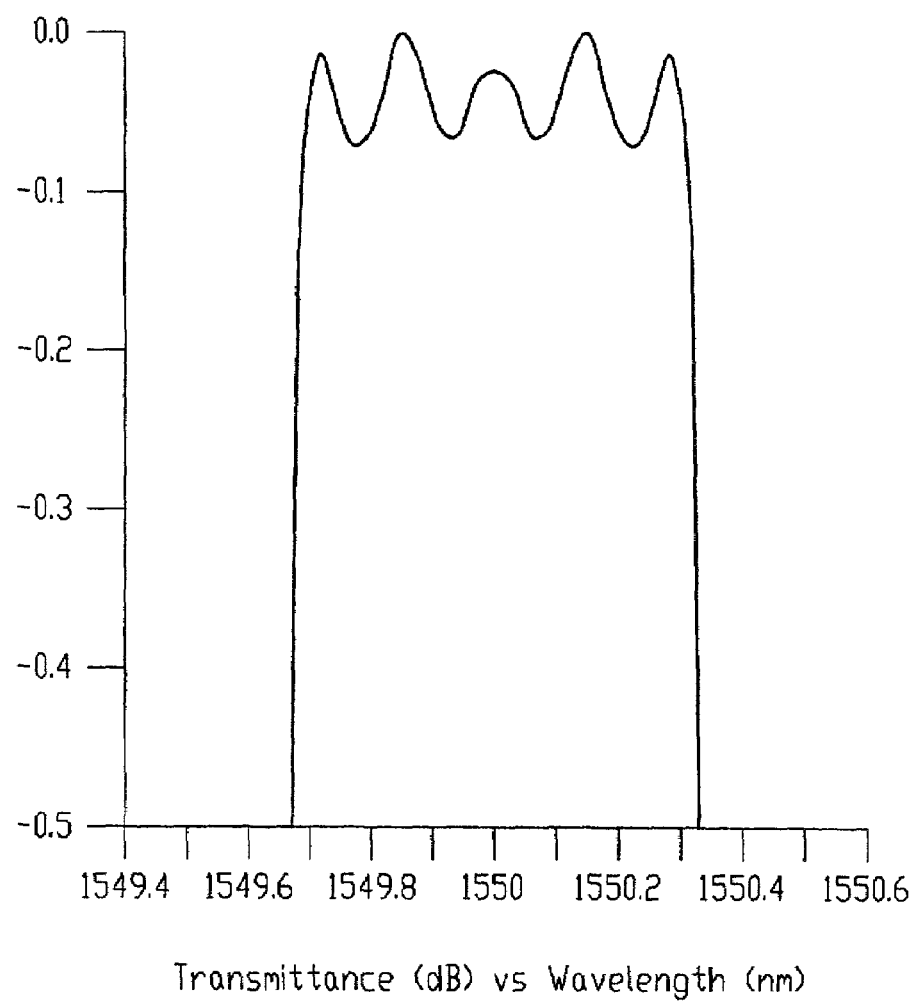
FIG. 5 is a graph of transmittance versus wavelength for a conventional tantalum oxide thin film filter having 180 film layers, where transmittance is shown on a scale between −0.5 dB and zero dB.
Figure 6:
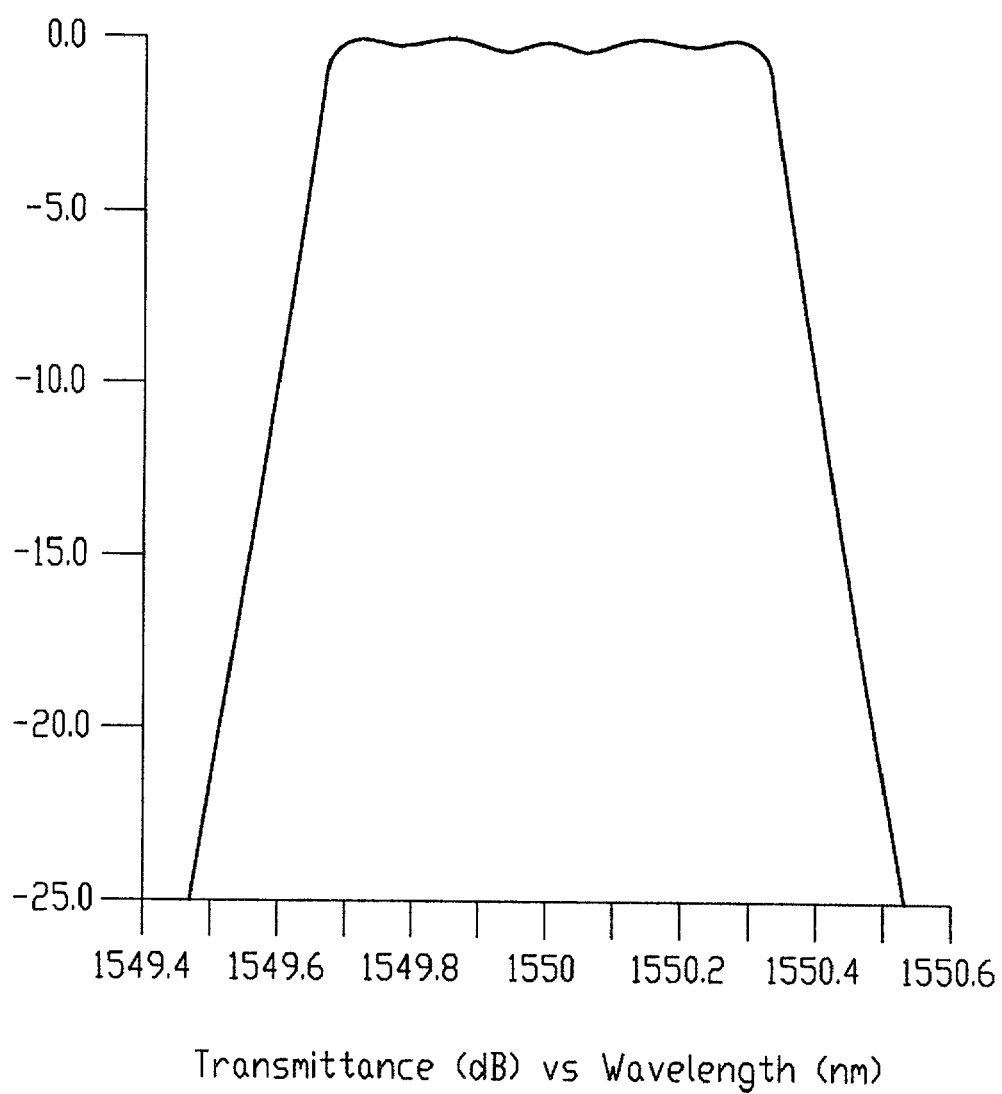
FIG. 6 is a graph of transmittance versus wavelength for the thin film filter of FIG. 5, where transmittance is shown on a scale between −25 dB and zero dB.

A thin film filter which has 160 layers of film can be produced according to the preferred embodiment. This thin film filter attains the same or better optical characteristics compared to a conventional DWDM thin film filter having 180 layers of film. Comparing the data of FIGS. 3 and 4 with those of FIGS. 5 and 6 respectively, the thin film filter of the present invention has a narrower pass bandwidth (1.028 nm at 25 dB and 0.644 nm at 0.5 dB) than that of the conventional thin film filter (1.066 nm at 25 dB and 0.644 nm at 0.5 dB). In addition, compared to the conventional thin film filter, the thin film filter of the present invention yields a waveform closer to an ideal square waveform.

It is to be understood that the above-described preferred embodiment of the present invention is intended to exemplify the present invention without limiting its scope. In addition, even though numerous characteristics and advantages of the present invention have been set forth in the foregoing description, together with details of the functions of the present invention, the disclosure is illustrative only. Changes may be made in detail, especially in matters of obviously similar methods, materials, processes and equipment, within the principles of the present invention to the full extent indicated by the broad general meaning of the terms in which the appended claims are expressed.

We claim:
1. A thin film filter for dense wavelength division multiplexing, the thin film filter comprising:
   a glass substrate; and
   a film stack mounted on the glass substrate, the film stack comprising a plurality of cavities; wherein
   each cavity comprises a first mirror layer, a second mirror layer, and a spacer layer arranged therebetween, both of the first mirror layer and the second mirror layer including low refractive index thin films and high refractive index thin films, and wherein each of the high refractive index thin films comprises a composition of indium-tin oxide having a high refractive index such that a substantially different refractive index between the low refractive index thin films and the high refractive index thin films is formed.

2. The thin film filter as described in claim 1, wherein the thin film filter further comprises a coupling film, and the coupling film adjoins an adjacent cavity of the plurality of cavities.

3. The thin film filter as described in claim 2, wherein the coupling film is made of a material having a relatively low refractive index.

4. The thin film filter as described in claim 1, wherein a range of the composition of indium-tin oxide is from 20% indium oxide plus 80% tin oxide to 17% indium oxide plus 83% tin oxide.

5. The thin film filter as described in claim 1, wherein the low refractive index thin films comprise silicon dioxide ($SiO_2$) or aluminum oxide ($Al_2O_3$).

6. The thin film filter as described in claim 5, wherein the low refractive index thin films and the high refractive index thin films are alternately deposited one on another.

7. The thin film filter as described in claim 6, wherein each of the low refractive index thin films and each of the high refractive index thin films has an optical thickness equal to one-quarter of a central wavelength of a pass bandwidth of the thin film filter.

8. A thin film filter for dense wavelength division multiplexing, the thin film filter comprising:
   a glass substrate; and
   a film stack mounted on the glass substrate, the film stack comprising five cavities, each cavity having a plurality of layers, each layer comprising low refractive index thin films and high refractive index thin films; wherein
   each of the high refractive index thin films comprises a composition of indium-tin oxide having a refractive index of about 2.1, and a total number of the layers in the five cavities is about 160.

9. The thin film filter as described in claim 8, wherein the thin film filter further comprises a coupling film, and the coupling film adjoins an adjacent cavity.

10. The thin film filter as described in claim 9, wherein the coupling film is made of a material having a relatively low refractive index.

11. The thin film filter as described in claim 10, wherein the low refractive index thin films comprise silicon dioxide ($SiO_2$) or aluminum oxide ($Al_2O_3$).

* * * * *